(12) United States Patent
Wu et al.

(10) Patent No.: US 12,489,567 B2
(45) Date of Patent: Dec. 2, 2025

(54) METHOD AND DEVICE FOR DETERMINING HARQ CODEBOOK

(71) Applicant: GUANGDONG OPPO MOBILE TELECOMMUNICATIONS CORP., LTD., Guangdong (CN)

(72) Inventors: Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 410 days.

(21) Appl. No.: 17/483,954

(22) Filed: Sep. 24, 2021

(65) Prior Publication Data
US 2022/0014317 A1    Jan. 13, 2022

Related U.S. Application Data

(63) Continuation of application No. PCT/CN2019/085386, filed on Apr. 30, 2019.

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/1273* (2013.01); *H04W 72/23* (2023.01)

(58) Field of Classification Search
CPC .... H04L 1/1819; H04L 1/1896; H04W 72/23; H04W 72/1273
See application file for complete search history.

(56) References Cited

U.S. PATENT DOCUMENTS

2012/0243486 A1*  9/2012  Zeira ................ H04W 72/30
                                                  370/329
2018/0006791 A1*  1/2018  Marinier .............. H04L 1/003
(Continued)

FOREIGN PATENT DOCUMENTS

| CN | 108023719 A | 5/2018 |
|---|---|---|
| CN | 108292974 A | 7/2018 |
| EP | 3934142 A1 | 1/2022 |

OTHER PUBLICATIONS

Examination Report for European Application No. 19927471.3 issued Dec. 6, 2022. 8 pages.
(Continued)

*Primary Examiner* — Jasper Kwoh
(74) *Attorney, Agent, or Firm* — PERKINS COIE LLP

(57) ABSTRACT

A method includes: a terminal device receives first Downlink Control Information (DCI), wherein the first DCI is used for scheduling a first Physical Downlink Shared Channel (PDSCH), the terminal device determines a first uplink resource, the first uplink resource being used for feeding back a first HARQ codebook corresponding to at least one of a plurality of channel groups, wherein downlink allocation indicators (DAIs) corresponding to the PDSCHs in the plurality of channel groups are consecutively counted; the terminal device determines the first HARQ codebook for the first uplink resource. By consecutively counting DAIs corresponding to PDSCHs in the plurality of channel groups, the present application can implement consistent understanding of the sizes of HARQ codebooks corresponding to the plurality of channel groups by a terminal device and a network device.

8 Claims, 8 Drawing Sheets

(51) Int. Cl.
*H04W 72/1273* (2023.01)
*H04W 72/23* (2023.01)

(56) References Cited

U.S. PATENT DOCUMENTS

| | | | |
|---|---|---|---|
| 2018/0241510 A1* | 8/2018 | Shen | H04L 1/18 |
| 2018/0279266 A1 | 9/2018 | Li et al. | |
| 2019/0103943 A1* | 4/2019 | Wang | H04L 1/1854 |
| 2020/0044791 A1* | 2/2020 | Tsai | H04L 1/1854 |
| 2020/0052825 A1* | 2/2020 | Sarkis | H04W 72/121 |
| 2020/0136763 A1* | 4/2020 | Lee | H04L 1/0031 |
| 2020/0314898 A1* | 10/2020 | Sun | H04W 72/0446 |
| 2021/0075556 A1* | 3/2021 | Karaki | H04B 7/0456 |
| 2021/0376961 A1* | 12/2021 | Shao | H04L 1/1854 |
| 2022/0053532 A1* | 2/2022 | Baldemair | H04W 72/1273 |
| 2022/0159692 A1* | 5/2022 | Lee | H04L 5/0053 |
| 2022/0217760 A1* | 7/2022 | Iyer | H04L 5/0053 |

OTHER PUBLICATIONS

First Office Action for Chinese Application No. 202111117909.1 issued Nov. 18, 2022. 13 pages with English translation.
Second Office Action for Chinese Application No. 202111117909.1 issued Jan. 28, 2023. 10 pages with English translation.
Second Office Action of the EP application No. 19927471.3, issued on May 23, 2023. 9 pages.
Extended European Search Report in the European application No. 19927471.3, mailed on Feb. 25, 2022. 13 pages.
MediaTek Inc. "Enhancements to HARQ for NR-U operation" R1-1901800; 3GPP TSG RAN WG1 #96; Athens, Greece; Feb. 25-Mar. 1, 2019. 13 pages.
MediaTek Inc. "Enhancements to HARQ for NR-U operation" R1-1904484; 3GPP TSG RAN WG1 #96bis; Xi'an, China; Apr. 8 -12, 2019. 12 pages.
OPPO. "HARQ enhancements for NR-U" R1-1904896; 3GPP TSG RAN WG1 #96bis; Xi'an, Greece;Apr. 8-12, 2019. 5 pages.
3GPP TSG RAN WG1 Meeting #96bis—R1-1904287—Xi'an, China, Apr. 8-12, 2019—7.2.2.2.3, Intel Corporation, Enhancements to HARQ for NR-unlicensed (12 pages).
3GPP TSG RAN WG1 Meeting #96bis—R1-1905649—Xi'an, China, Apr. 8-12, 2019—7.2.2.2.3, Huawei, Feature lead summary of HARQ enhancements for NR-U (29 pages).
International Search Report issued Dec. 31, 2019 of PCT/CN2019/085386 (4 pages).
Examination report for European Application No. 19927471.3 Issued Nov. 2, 2023, 7 Pages.
Fourth Office Action of the EP application No. 19927471.3, issued on Apr. 9, 2024. 3 pages.

* cited by examiner

METHOD AND DEVICE FOR DETERMINING HARQ CODEBOOK

CROSS-REFERENCE TO RELATED APPLICATION

This application is a continuation application of International PCT Application No. PCT/CN2019/085386 filed on Apr. 30, 2019, the entire content of which is hereby incorporated by reference.

TECHNICAL FIELD

Implementations of the present disclosure relate to the communication field, and more particularly, to a method and device for determining an HARQ codebook.

BACKGROUND

When a New Radio (NR) system is applied to an unlicensed frequency band, StandAlone may be supported, that is, it does not depend on a carrier on a licensed frequency band to provide an auxiliary service. After receiving a Physical Downlink Shared Channel (PDSCH) on an unauthorized carrier, a terminal device needs to send Hybrid Automatic Repeat reQuest Acknowledgement (HARQ-ACK) information, that is, an HARQ codebook, corresponding to the PDSCH on an unauthorized carrier. How to determine the HARQ codebook corresponding to the PDSCH is a problem worth studying.

SUMMARY

A method and device for determining an HARQ codebook are provided.

In a first aspect, a method for determining a Hybrid Automatic Repeat reQuest (HARQ) codebook is provided, including: determining, by a terminal device, a first uplink resource, wherein the first uplink resource is used for feeding back a first HARQ codebook corresponding to at least one of multiple channel groups, wherein Downlink assignment indexes (DAIs) corresponding to Physical Downlink Shared Channels (PDSCHs) in the multiple channel groups are counted consecutively; and determining, by the terminal device, the first HARQ codebook for the first uplink resource.

In a second aspect, a method for receiving a Hybrid Automatic Repeat reQuest (HARQ) codebook is provided, including: determining, by a network device, a first uplink resource, wherein the first uplink resource is used for feeding back a first HARQ codebook corresponding to at least one of multiple channel groups, wherein Downlink assignment indexes (DAIs) corresponding to Physical Downlink Shared Channel (PDSCHs) in the multiple channel groups are counted consecutively; and receiving, by the network device, the first HARQ codebook on the first uplink resource.

In a third aspect, there is provided a terminal device configured to perform the method according to the first aspect described above or any of various implementations thereof.

Specifically, the terminal device includes function modules for performing the method in the above first aspect or any of various implementations thereof.

In a fourth aspect, there is provided a network device configured to perform the method according to the second aspect described above or any of various implementations thereof.

Specifically, the network device includes function modules for performing the method in the above second aspect or any of various implementations thereof.

In a fifth aspect, a terminal device is provided, including a processor. The processor is configured to call and run a computer program stored in a memory to execute the method in the above first aspect or any of various implementations thereof.

In a sixth aspect, there is provided a network device including a processor and a memory. The memory is configured to store a computer program, and the processor is configured to call and run the computer program stored in the memory to perform the method in the above second aspect or any of various implementations thereof.

In a seventh aspect, there is provided a chip for implementing the method according to any one of the first and second aspects described above or any of various implementations thereof. Specifically, the chip includes: a processor configured to call and run a computer program from a memory, to enable a device disposed with the chip to perform the method in any one of the above first to second aspects or any of various implementations thereof.

In an eighth aspect, a computer-readable storage medium is provided, configured to store a computer program, wherein the computer program enables a computer to perform the method in any one of the above first to second aspects or any of various implementations thereof.

In a ninth aspect, a computer program product is provided, including computer program instructions that enable a computer to perform the method in any one of the above first to second aspects or any of various implementation thereof.

In a tenth aspect, there is provided a computer program, which, when running on a computer, enables the computer to perform the method according to any one of the first and third aspects described above or any of various implementations thereof.

DETAILED DESCRIPTION

Technical schemes in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solution of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a future 5G system or other communication systems, etc.

Generally speaking, traditional communication systems support a limited number of connections and are easy to implement. However, with the development of communication technology, mobile communication systems will not only support traditional communications, but also support, for example, device to device (D2D) communication, machine to machine (M2M) communication, machine type communication (MTC), vehicle to vehicle (V2V) communication, etc., and the implementations of the present disclosure may also be applied to these communication systems.

Optionally, a communication system in the implementations of the present disclosure may also be applied to a Carrier Aggregation (CA) scenario, a Dual Connectivity (DC) scenario, or a Standalone (SA) scenario, etc.

Figure 1:
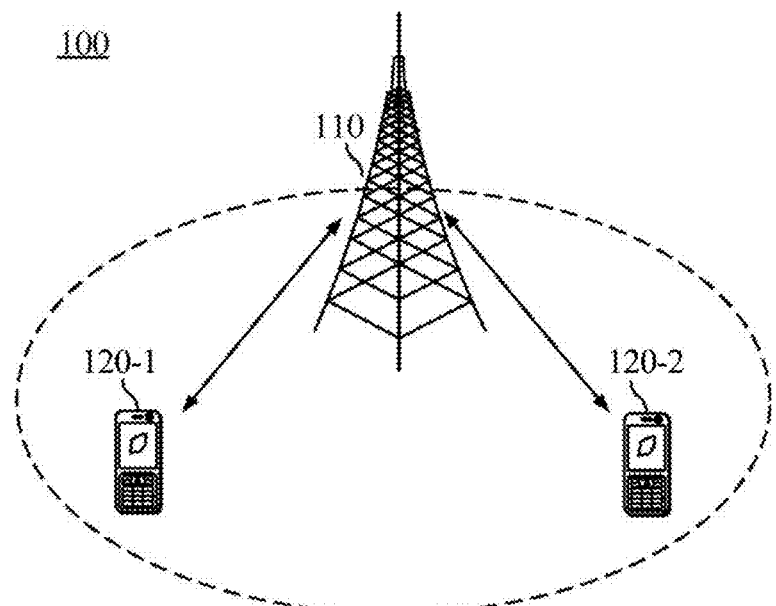
FIG. 1 is an example of an application scenario of the present disclosure.

FIG. 1 is a schematic diagram of a possible wireless communication system according to an implementation of the present disclosure. The wireless communication system 100 may include a network device 110. The network device 110 may provide communication coverage for a specific geographical area, and may communicate with terminal devices located within the coverage area.

Optionally, the network device 100 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a future network side device, or a network device in a future evolved Public Land Mobile Network (PLMN), etc.

The wireless communication system 100 further includes at least two terminal devices 120-1 and 120-2 located within the coverage area of the network device 110.

The terminal devices 120-1 and 120-2 may be mobile or fixed.

Optionally, the terminal devices 120-1 and 120-2 may refer to user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may also be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to wireless modems, a vehicle-mounted device, a wearable device, a terminal device in a 5G network, or a terminal device in a future evolved Public Land Mobile Network (PLMN), etc., and implementations of the present disclosure are not limited thereto. Optionally, device to device (D2D) communication may be established between the terminal devices 120-1 and 120-2.

The network device 110 may provide services for a cell, and the terminal devices 120-1 and 120-2 communicates with the network device 110 through transmission resources (e.g., frequency domain resources or spectrum resources) used by the cell. The cell may be a cell corresponding to the network device 110. The cell may belong to a macro base station, or a base station corresponding to a small cell. The small cell herein may include, for example, a Metro cell, a Micro cell, a Pico cell, a Femto cell, etc., which have characteristics such as small coverage range and low transmission power, and are suitable for providing high-speed data transmission services.

FIG. 1 illustrates exemplarily one network device and two terminal devices, but the present disclosure is not limited thereto. The wireless communication system 100 may include multiple network devices, and other numbers of terminal devices may be included within the coverage area of each network device. In addition, the wireless communication system 100 may further include other network entities, such as a network controller and a mobile management entity.

It should be understood that the system shown in FIG. 1 may be applied to a licensed spectrum or an unlicensed spectrum.

It should also be understood that the unlicensed spectrum is a spectrum divided by countries and regions that may be used for communication of radio devices. This spectrum is generally regarded as a shared spectrum, that is, communication devices in different communication systems can use this spectrum without applying for a proprietary spectrum license from the government, as long as they meet regulatory requirements set by countries or regions on this spectrum.

In order to enable various communication systems using unlicensed spectrum for wireless communication to coexist amicably on this spectrum, some countries or regions have stipulated the legal requirements that must be met for using unlicensed spectrum. For example, the communication devices follow the "Listen Before Talk (LBT)" principle, that is, before sending signals on a channel of the unlicensed spectrum, the communication devices need to performed channel listening first, and the communication devices can send signals only when the result of channel listening is that the channel is idle. If the result of channel listening performed by the communication devices on an unlicensed spectrum channel is that the channel is busy, the communication devices cannot send signals. In order to ensure fairness, in one transmission, a duration of signal transmission performed by a communication device using the channel on the unlicensed spectrum may not exceed a Maximum Channel Occupancy Time (MCOT).

An HARQ feedback process is described below.

An NR system supports dynamic determination of HARQ feedback timing. A base station schedules a terminal device to receive a PDSCH through Downlink Control Information (DCI), wherein the DCI includes indication information of a Physical Uplink Control Channel (PUCCH) resource for transmitting an HARQ codebook corresponding to the PDSCH. Specifically, the indication information includes: a PUCCH resource indicator, used for determining a PUCCH resource; and an HARQ timing indicator, used for dynamically determining a time domain position of the PUCCH resource. Herein, the HARQ timing indicator information is used for determining a value in a preconfigured HARQ timing set. For example, when the HARQ timing indicator information is 000, k0 in the HARQ timing set is indicated, and when the HARQ timing indicator information is 001, k1 in the HARQ timing set is indicated, etc.

If the feedback is dynamic codebook feedback, the DCI also includes following information: a Downlink assignment index (DAI), wherein the DAI includes counter DAI information and/or total DAI information, wherein the counter DAI information is used for indicating which PDSCH in a current HARQ feedback window a currently scheduled PDSCH is, and the DAI total information is used for indicating how many PDSCHs are totally scheduled in the current HARQ feedback window.

According to the above information, the terminal device can determine a PUCCH resource for feeding back the HARQ codebook and a position of the HARQ codebook in a codebook transmitted on the PUCCH resource.

Optionally, when using a dynamic codebook for HARQ codebook feedback, the terminal device may perform dynamic codebook feedback in single-carrier and multi-carrier scenarios.

That is, the dynamic codebook may be specifically classified into the following two cases.

First Case: A Single-Carrier Scenario

Figure 2:
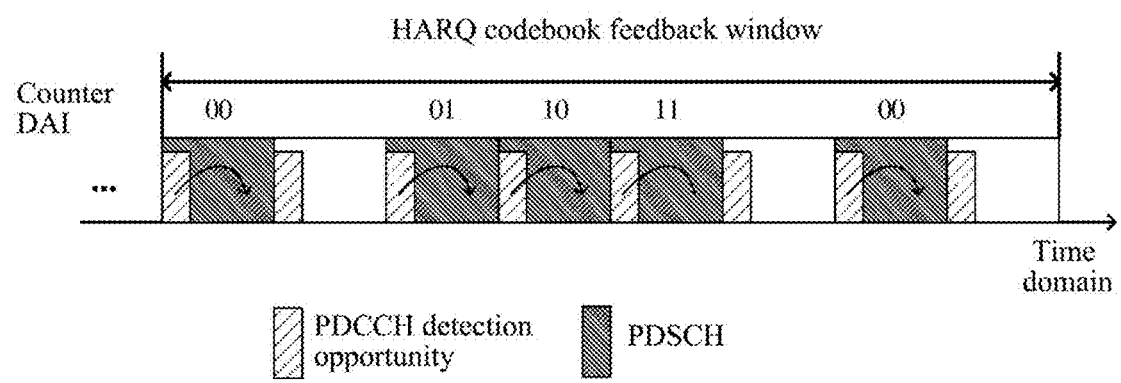
FIG. 2 is a schematic diagram of an HARQ-ACK feedback window in a single-carrier scenario according to an implementation of the present disclosure.

The network device will send counter DAI (C-DAI) information to the terminal device while sending a PDSCH to the terminal device, wherein the counter DAI information is sent to the terminal device through a Physical Downlink Control Channel (PDCCH) for the terminal device to determine an HARQ feedback codebook. That is, the counter DAI is used for indicating which PDSCH in the HARQ feedback window a PDSCH currently scheduled by the PDCCH is, wherein a PDSCH sorting mode is sorted according to an order of PDCCH detection opportunities. In order to reduce a quantity of bits of the counter DAI information, counting may performed in a modular operation mode. For example, if a quantity of bits of the counter DAI is 2 bits, a value of the counter DAI is modulo 4; if a quantity of bits of the counter DAI is 3 bits, a value of the counter DAI is modulo 8. As shown in FIG. 2, there are totally 8 time slots in an HARQ codebook feedback window, and each time slot is configured with a PDCCH detection opportunity. The network device schedules the terminal device to receive PDSCHs on a 1st, 3rd, 4th, 5th, and 7th PDCCH detection opportunities in the 8 PDCCH detection opportunities. Assuming that a quantity of bits of the counter DAI is 2 bits, correspondingly, counter DAIs corresponding to PDSCHs on the 5 time slots are 00, 01, 10, 11, and 00, respectively.

For each PDSCH, a corresponding quantity K of HARQ codebook feedback bits may be configured by a higher layer. For example, if at least one PDSCH in PDSCHs for which the terminal device is scheduled supports 2 codewords, a quantity of HARQ codebook bits corresponding to each of all PDSCHs is 2 bits (K=2). For another example, when feedback based on a Code block group (CBG) is supported, it is assumed that a maximum quantity of HARQ codebook bits corresponding to one PDSCH is 8 bits, and a quantity of HARQ codebook bits corresponding to each PDSCH in all PDSCHs is 8 bits (K=8).

In an example of FIG. 2, it is assumed that K=2, which corresponds to two codewords. After the terminal device receives the 5 PDSCHs, the terminal device may determine that a codebook size in the HARQ codebook feedback window is 10 bits, as shown as table 1 below.

TABLE 1

| Counter DAI "00" | | Counter DAI "01" | | Counter DAI "10" | | Counter DAI "11" | | Counter DAI "00" | |
|---|---|---|---|---|---|---|---|---|---|
| Codeword 0 | Codeword 1 | Codeword 0 | Codeword 1 | Codeword 0 | Codeword 1 | Codeword 0 | Codeword 1 | Codeword 0 | Codeword 1 |

When the terminal device only receives part of the 5 PDSCHs, for example, the terminal device does not receive the PDSCH with the counter DAI of 01, in this case, the PDSCH with the counter DAI of 10 is received after the PDSCH with the counter DAI of 00 is received. In this case, the terminal device may determine that it has lost the PDSCH with the counter DAI of 01, so a Negative Acknowledgement (NACK) will be filled at a corresponding position, as shown as table 2 below.

TABLE 2

| Counter DAI "00" | | Counter DAI "01" | | Counter DAI "10" | | Counter DAI "11" | | Counter DAI "00" | |
|---|---|---|---|---|---|---|---|---|---|
| Codeword 0 | Codeword 1 | NACK | NACK | Codeword 0 | Codeword 1 | Codeword 0 | Codeword 1 | Codeword 0 | Codeword 1 |

It should be understood that if there is only one codeword in a PDSCH, an HARQ codebook corresponding to codeword 1 is NACK.

Second Case: A Multi-Carrier Scenario.

While sending a PDSCH to the terminal device, the network device will send two pieces of DAI information, i.e., a counter DAI and a total DAI (T-DAI), to the terminal device, wherein the two pieces of DAI information are sent to the terminal device through a PDCCH for the terminal device to determine an HARQ feedback codebook. Herein the counter DAI is used for indicating which PDSCH in the HARQ feedback window a PDSCH currently scheduled by the PDCCH is, and the total DAI is used for telling the terminal device how many HARQ codebooks there totally are in the HARQ feedback window so far. A PDSCH sorting mode is sorted according to an order of PDCCH detection opportunities, specifically, it may be in an order of the frequency domain first and then the time domain. In order to reduce a quantity of bits of the counter DAI (or total DAI) information, counting may be performed in a modular operation mode. For example, if a quantity of bits of the counter DAI (or the total DAI) is 2 bits, a value of the counter DAI (or the total DAI) is modulo 4; if a quantity of bits of the counter DAI (or the total DAI) is 3 bits, a value of the counter DAI (or the total DAI) is modulo 8.

Figure 3:
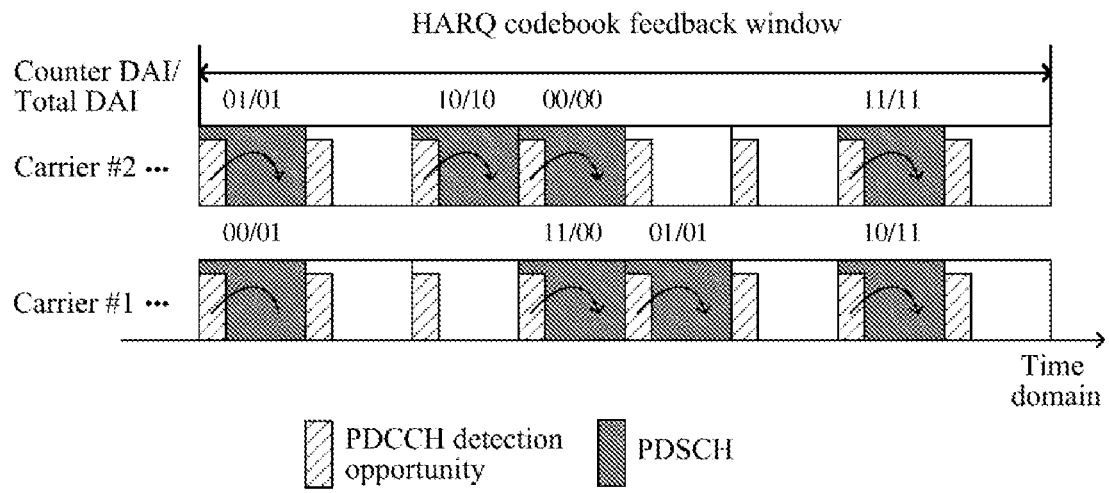
FIG. 3 is a schematic diagram of an HARQ-ACK feedback window in a multi-carrier scenario according to an implementation of the present disclosure.

As shown in FIG. 3, a terminal device is configured with two carriers, a total of eight time slots are included in the HARQ codebook feedback window, and each time slot of each carrier is configured with a PDCCH detection opportunity, then the PDCCH detection opportunities are sorted as a first time slot of carrier #1, a first time slot of carrier #2, a second time slot of carrier #1, a second time slot of carrier #2, . . . , an eighth time slot of carrier #1, an eighth time slot of carrier #2. The network device schedules the terminal device to receive PDSCHs on the 1st, 2nd, 6th, 7th, 8th, 9th, 13th, and 14th time slots in the 16 PDCCH detection opportunities. Assuming that quantities of bits of the counter DAI and the total DAI are 2 bits respectively, accordingly, the counter DAIs and the total DAIs corresponding to PDSCHs on these 8 time slots are shown in FIG. 3.

In an example of FIG. 3, it is assumed that K=2, which corresponds to two codewords. Assuming that the terminal device does not receive a PDSCH on the fourth time slot, the terminal device may determine a codebook in the HARQ codebook feedback window as shown as table 3 below.

not be fed back temporarily. For example, a preconfigured HARQ timing set includes a value $k_L$ indicating an invalid resource indicator, and when the HARQ timing indicator information is 111, $k_L$, in the HARQ timing set is indicated, indicating that a corresponding PUCCH resource cannot be determined temporarily.

In addition, in order to flexibly feed back HARQ information corresponding to a PDSCH on the unlicensed frequency band, the base station may group scheduled PDSCHs and indicate grouping information of the PDSCHs through a displaying signaling, so that a UE performs corresponding HARQ feedback according to different groups after receiving the PDSCHs. If a certain group of HARQ information of the UE fails to be transmitted due to an LBT failure in a certain transmission, or the base station fails to detect a certain group of HARQ information expected to be transmitted by the UE on a certain PUCCH resource, the base station may trigger the UE to retransmit this group of HARQ information through DCI. The UE may keep a same codebook size as that of an initial transmission when retransmitting a certain group of HARQ information, and may also add new HARQ information when retransmitting.

Figure 4:
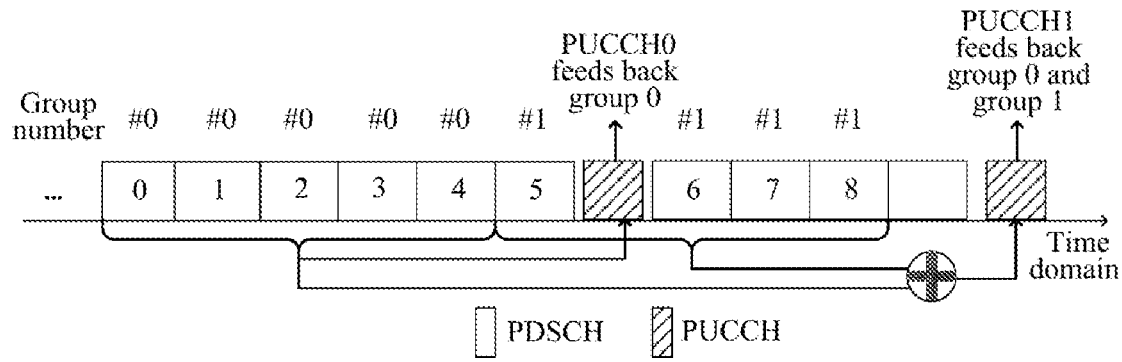
FIG. 4 is a schematic block diagram of a positional relationship between PDSCH groups and feedback groups according to an implementation of the present disclosure.
Figure 5:
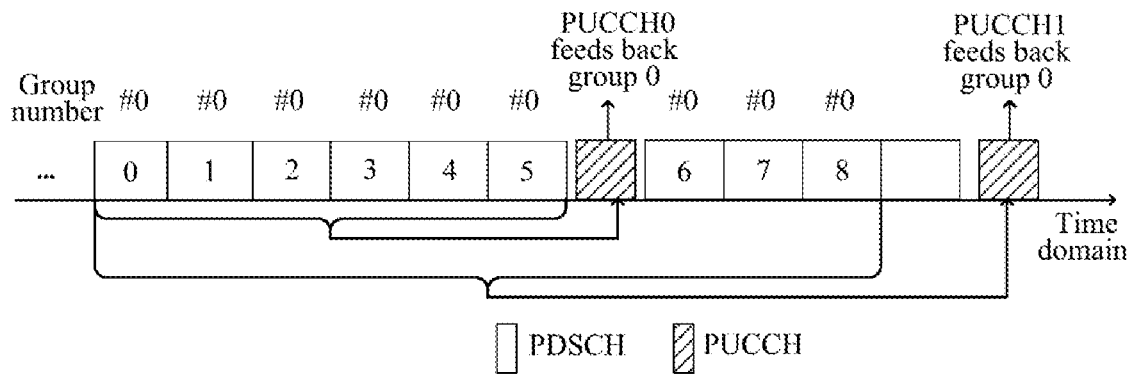
FIG. 5 is a schematic block diagram of a positional relationship between PDSCH groups and feedback groups according to an implementation of the present disclosure.

FIG. 4 and FIG. 5 are schematic block diagrams of PDSCH groups and feedback groups when a UE needs to perform HARQ feedback according to grouping of a base station.

When the UE needs to perform HARQ feedback according to the grouping of the base station, specific feedback modes may include the following two modes.

First Mode

After the base station performs grouping, when HARQ information included in the group is initially transmitted or retransmitted, an HARQ codebook size does not change. Or, if one valid uplink resource for transmission has been indicated to HARQ corresponding to a PDSCH in a certain group, no new PDSCH will be added into the group. In the first mode, HARQ information included in multiple groups may be fed back on one PUCCH resource. For example, referring to FIG. 4, PUCCH 0 may feed back HARQ information included in group 0, and HARQ information included in the group 0 and group 1 may be fed back on PUCCH 1.

TABLE 3

| "00/01" | "01/01" | "10/10" | "11/xx" | "00/xx" | "01/01" | "10/11" | "11/11" |
|---|---|---|---|---|---|---|---|
| Code-word 0 Code-word 1 Code-word 0 Code-word 1 Code-word 0 Code-word 1 | | | NACK NACK NACK NACK | | Code-word 0 Code-word 1 Code-word 0 Code-word 1 Code-word 0 Code-word 1 | | |

It should be understood that a PDSCH scheduled by a PDCCH may or may not be on a same time slot as the PDCCH, which is not limited by the implementations of the present disclosure.

When an NR system is applied to an unlicensed frequency band, a UE needs to send HARQ feedback corresponding to a PDSCH on an unlicensed carrier after receiving the PDSCH on an unlicensed carrier.

At present, on the unlicensed frequency band, the HARQ timing indicator information may be used not only to determine a PUCCH time domain resource for transmitting HARQ corresponding to the PDSCH, but also to indicate a state in which the HARQ corresponding to the PDSCH will Second Mode After the base station performs grouping, when HARQ information included in the group is initially transmitted or retransmitted, an HARQ codebook size may be different. Or, if one valid uplink resource for transmission has been indicated to HARQ corresponding to a PDSCH in a certain group, a new PDSCH may be added into the group. For example, referring to FIG. 5, HARQ information included in group 0 may be fed back on PUCCH 0 and PUCCH 1, respectively.

Optionally, DAIs corresponding to PDSCHs transmitted in multiple groups may be uniformly counted.

Figure 6:
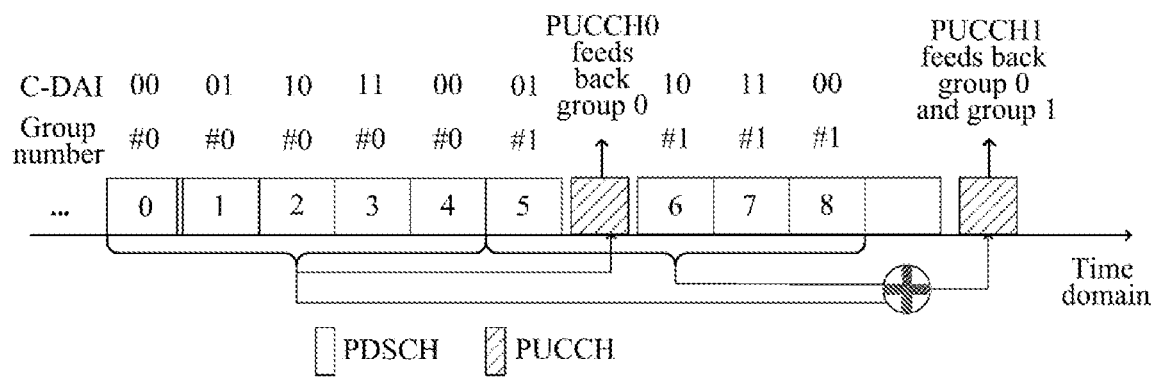
FIG. 6 is a schematic block diagram of a positional relationship among a DAI, a PDSCH group, and a feedback group according to an implementation of the present disclosure.

FIG. 6 is a schematic block diagram of a positional relationship among channel groups, DAIs, and feedback groups according to an implementation of the present disclosure.

It should be understood that in the implementation of the present disclosure, one carrier is taken as an example for description, and a similar method may be used for a case of multiple carriers.

With reference to FIG. 6, a PDSCH group with group number #0 includes PDSCH 0, PDSCH 1, PDSCH 2, PDSCH 3, and PDSCH 4. A PDSCH group with group number #1 includes PDSCH 5, PDSCH 6, PDSCH 7, and PDSCH 8. Herein, a DAI corresponding to PDSCH 0 to a DAI corresponding to PDSCH 8 are counted consecutively.

Figure 7:
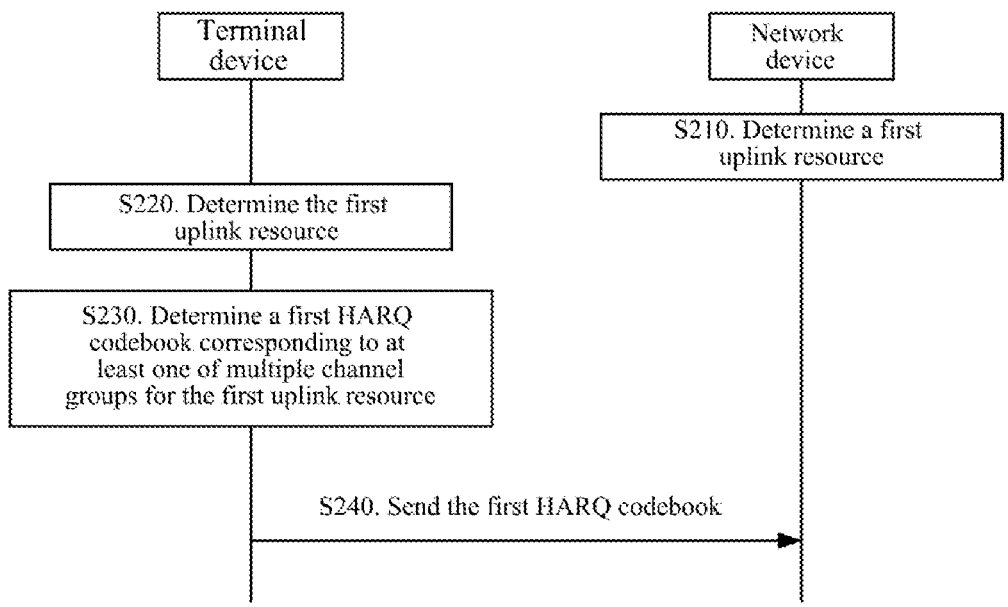
FIG. 7 is a schematic flowchart of a method for transmitting an HARQ codebook according to an implementation of the present disclosure.

FIG. 7 is a schematic flowchart of a method 200 for transmitting an HARQ codebook according to an implementation of the present disclosure. The method 200 may be performed by interactions of a terminal device and a network device. The terminal device shown in FIG. 7 may be the terminal device as shown in FIG. 1, and the network device shown in FIG. 7 may be the access network device as shown in FIG. 1.

Referring to FIG. 7, the method 200 may include part or all of the following contents.

In S210, a network device determines a first uplink resource.

In S220, a terminal device determines the first uplink resource.

In S230, the terminal device determines a first HARQ codebook corresponding to at least one of multiple channel groups for the first uplink resource.

In S240, the terminal device sends the first HARQ codebook to the network device.

The terminal device determines the first uplink resource, wherein the first uplink resource is used for feeding back a first HARQ codebook corresponding to at least one of multiple channel groups, wherein Downlink assignment indexes (DAIs) corresponding to Physical Downlink Shared Channels (PDSCHs) in the multiple channel groups are counted consecutively. The terminal device determines the first HARQ codebook for the first uplink resource.

The network device determines the first uplink resource, wherein the first uplink resource is used for feeding back a first HARQ codebook corresponding to at least one of multiple channel groups, wherein Downlink assignment indexes (DAIs) corresponding to Physical Downlink Shared Channels (PDSCHs) in the multiple channel groups are counted consecutively. The network device receives the first HARQ codebook on the first uplink resource.

The first uplink resource may be a resource for transmitting an uplink channel.

Optionally, the uplink channel includes, but is not limited to, a Physical Random Access Channel (PRACH), a Physical Uplink Control Channel (PUCCH), a Physical Uplink Shared channel (PUSCH), etc. It should be understood that implementations of the present disclosure may include an uplink channel with a same name as above and a different function from above, or may include an uplink channel with a different name from above and a same function as above, which is not limited by the present disclosure.

It should be understood that the HARQ codebook may also be referred to as HARQ information, an HARQ-ACK codebook, or HARQ-ACK information.

Optionally, the channel group may be a downlink channel group. For example, the channel group is a channel group corresponding to PDSCHs, or a channel group corresponding to PDCCHs.

Optionally, the first uplink resource is used for feeding back a first HARQ codebook corresponding to at least one of multiple channel groups, wherein the first HARQ codebook includes an HARQ codebook corresponding to a channel in each of the at least one channel group. For example, the channel group is a PDSCH channel group, then the first HARQ codebook includes an HARQ codebook corresponding to a PDSCH in each of the at least one PDSCH channel group.

Optionally, when a first DAI corresponding to a first PDSCH in a first channel group of the at least one channel group is not an initial value, information of the first HARQ codebook at a starting position is placeholder information.

Optionally, when a first DAI corresponding to a first PDSCH in a first channel group of the at least one channel group is an initial value, information of the first HARQ codebook at a starting position is an HARQ codebook corresponding to the first PDSCH.

Optionally, the first HARQ codebook between the starting position and a position corresponding to the first DAI is placeholder information, wherein the position corresponding to the first DAI is a position, determined based on a count of the first DAI, in the first HARQ codebook.

Optionally, the at least one channel group includes at least two channel groups.

Optionally, the at least two channel groups are channel groups with consecutively counted DAIs triggered for feeding back.

Optionally, the at least two channel groups include channel groups with disconsecutively counted DAIs triggered for feeding back, wherein the first HARQ codebook is an HARQ codebook generated based on a consecutively counted DAI, and a position corresponding to a channel group not triggered for feeding back in the first HARQ codebook is placeholder information.

Optionally, an arrangement order of channel groups in the multiple channel groups is a DAI counting order, or a scheduling order.

Optionally, an arrangement order of channel groups in the at least one channel group is an order of channel groups triggered for feeding back in the multiple channel groups; or, an arrangement order of channel groups in the at least one channel group is a DAI counting order; or, an arrangement order of channel groups in the at least one channel group is a scheduling order.

Figure 8:
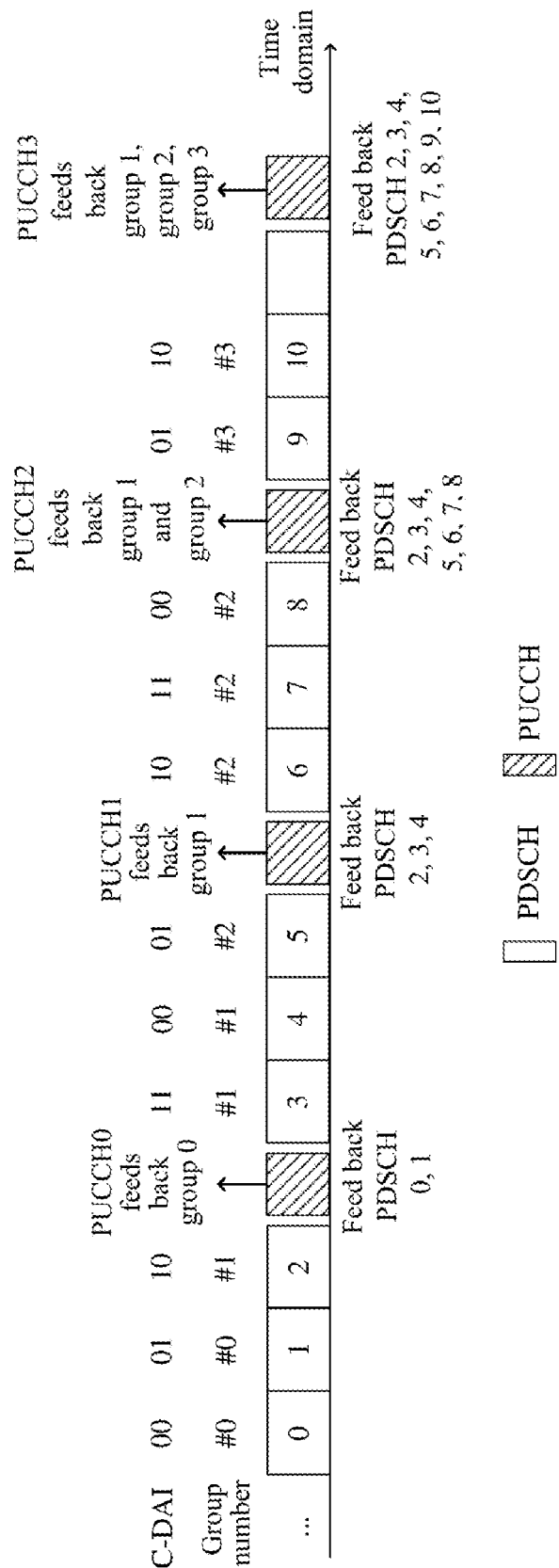
FIG. 8 is another schematic block diagram of a positional relationship among DAIs, PDSCH groups, and feedback groups according to an implementation of the present disclosure.

FIG. 8 is a schematic block diagram of a positional relationship among channel groups, DAIs, and feedback groups according to an implementation of the present disclosure.

With reference to FIG. 8, the first HARQ codebook will be described in detail below when the at least two channel groups are channel groups with consecutively counted DAIs triggered for feeding back.

Please referring to FIG. 8, if a UE needs to only feed back HARQ information included in group 1 on a PUCCH 1 resource, when the UE does not receive PDSCH 1 (or PDSCH 2, here, not receiving the PDSCH 1 is taken as an example), the UE cannot determine whether the PDSCH 1 belongs to group 0 or the group 1, then the UE may consider that numbers of PDSCHs included in the group 1 are 2, 3, 4, or consider that numbers of PDSCHs included in the group 1 are 1, 2, 3, 4, that is, the UE will be unable to determine the starting PDSCH of the PDSCHs included in the group 1, thereby unable to determine an HARQ codebook corresponding to the group 1 (A main problem when only HARQ information corresponding to one group is fed back on one uplink resource).

In a possible implementation, when the UE feeds back HARQ information on one uplink resource such as a PUCCH resource, a codebook is always prepared from 00 for the HARQ information fed back on the uplink resource. In this way, the base station and the UE can determine a size of an HARQ codebook fed back on one PUCCH resource.

With reference to FIG. 8, if only one HARQ codebook of one group is fed back on one uplink resource, for example, group 0 is fed back on PUCCH 0, and group 1 is fed back on PUCCH 1, no matter what a DAI corresponding to a first PDSCH in this group received by the UE is, the UE will prepare an HARQ codebook from a DAI of 0. In an implementation of the present disclosure, a feedback codebook of one PDSCH corresponding to two codewords is taken as an example.

An HARQ codebook corresponding to PDSCHs in group 0 included in an HARQ codebook transmitted on PUCCH 0 is shown as table 4.

TABLE 4

| DAI = 00 (PDSCH 0) | | DAI = 01 (PDSCH 1) | |
|---|---|---|---|
| Codeword 0 | Codeword 1 | Codeword 0 | Codeword 1 |

An HARQ codebook corresponding to PDSCHs in group 1 included in an HARQ codebook transmitted on PUCCH 1 is shown as table 5.

TABLE 5

| DAI = 00 | | DAI = 01 | | DAI = 10 (PDSCH 2) | |
|---|---|---|---|---|---|
| NACK | NACK | NACK | NACK | Codeword 0 | Codeword 1 |
| DAI = 11 (PDSCH 3) | | DAI = 00 (PDSCH 4) | | | |
| Codeword 0 | Codeword 1 | Codeword 0 | Codeword 1 | | |

In feedback on PUCCH 1, through preparing the HARQ codebook from a counter DAI of 0, no matter whether the UE has received PDSCH 1 or PDSCH 2, the base station and the UE have consistent understanding of codebook positions corresponding to PDSCHs correctly received by the UE, thus realizing transmission of the HARQ codebook.

If an HARQ codebook of at least two groups is fed back on one uplink resource, in one case, it may be limited that the base station can only trigger HARQ codebook feedback of continuous multiple groups, so as to avoid inconsistent understanding of HARQ codebooks between the base station and the UE caused by loss of a DAI. For example, group 1 and group 2 are fed back on PUCCH 2 (here, the group 1 and the group 2 are continuous, but it is limited here that sending groups are continuous, it is not necessary that group numbers are continuous), the group 1, the group 2, and group 3 are fed back on PUCCH 3, and the UE may prepare a codebook according to a scheduling order of the base station. When the UE prepares an HARQ codebook transmitted on the PUCCH resource, no matter what a DAI corresponding to a first PDSCH in a first sorted group is, the UE prepares the HARQ codebook starting from a DAI of 0. Since the feedback is for feedback triggering of a codebook of continuous groups, the UE prepares an HARQ codebook according to a DAI order, and does not need to supplement placeholder information.

An HARQ codebook corresponding to PDSCHs in group 1 and group 2 included in an HARQ codebook transmitted on PUCCH 2 is shown as table 6.

TABLE 6

| DAI = 00 | | DAI = 01 | | DAI = 10 (PDSCH 2) | |
|---|---|---|---|---|---|
| NACK | NACK | NACK | NACK | Codeword 0 | Codeword 1 |
| DAI = 11 (PDSCH 3) | | DAI = 00 (PDSCH 4) | | DAI = 01 (PDSCH 5) | |
| Codeword 0 | Codeword 1 | Codeword 0 | Codeword 1 | Codeword 0 | Codeword 1 |
| DAI = 10 (PDSCH 6) | | DAI = 11 (PDSCH 7) | | DAI = 00 (PDSCH 8) | |
| Codeword 0 | Codeword 1 | Codeword 0 | Codeword 1 | Codeword 0 | Codeword 1 |

An HARQ codebook corresponding to PDSCHs in group 1, group 2, and group 3 included in an HARQ codebook transmitted on PUCCH 3 may be shown as table 7.

TABLE 7

| DAI = 00 | | DAI = 01 | | DAI = 10 (PDSCH 2) | |
|---|---|---|---|---|---|
| NACK | NACK | NACK | NACK | Codeword 0 | Codeword 1 |
| DAI = 11 (PDSCH 3) | | DAI = 00 (PDSCH 4) | | DAI = 01 (PDSCH 5) | |
| Codeword 0 | Codeword 1 | Codeword 0 | Codeword 1 | Codeword 0 | Codeword 1 |
| DAI = 10 (PDSCH 6) | | DAI = 11 (PDSCH 7) | | DAI = 00 (PDSCH 8) | |
| Codeword 0 | Codeword 1 | Codeword 0 | Codeword 1 | Codeword 0 | Codeword 1 |
| DAI = 01 (PDSCH 9) | | DAI = 10 (PDSCH 10) | | | |
| Codeword 0 | Codeword 1 | Codeword 0 | Codeword 1 | | |

In continuous feedback of multiple groups on PUCCH 1, through starting from a counter DAI of 0 and DAIs corresponding to multiple groups being consecutively counted, it can be ensured that the base station and the UE have consistent understanding of codebook positions corresponding to PDSCHs correctly received by the UE, thus realizing transmission of the HARQ codebook.

If an HARQ codebook of at least two groups is fed back on one uplink resource, in another case, it is not limited that the base station can only trigger HARQ codebook feedback of continuous multiple groups, which has an advantage that HARQ information corresponding to an HARQ process included in a middle group(s) may be released as soon as possible for downlink scheduling of the base station.

Figure 9:
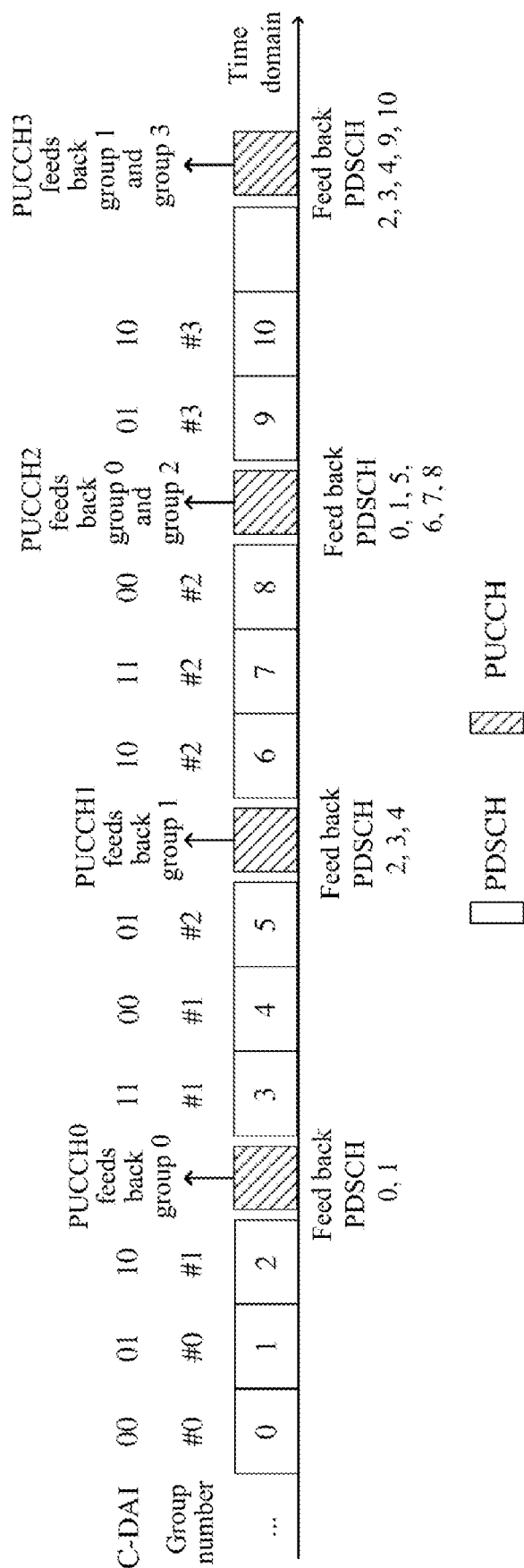
FIG. 9 is another schematic block diagram of a positional relationship among DAIs, PDSCH groups, and feedback groups according to an implementation of the present disclosure.

FIG. 9 is another schematic block diagram of a positional relationship among channel groups, DAIs, and feedback groups according to an implementation of the present disclosure.

In a case of multiple channel groups with consecutively counted DAIs and at least two of the multiple channel groups being channel groups with disconsecutively counted DAIs triggered for feeding back, the first HARQ codebook will be described in detail with reference to FIG. 9 below.

Please referring to FIG. 9, groups 0 and 2 are fed back on PUCCH 2, and groups 1 and 3 are fed back on PUCCH 3, and the UE may prepare a codebook according to a scheduling order of the base station. When the UE prepares an HARQ codebook transmitted on the PUCCH resource, no matter what a DAI corresponding to a first PDSCH in a first sorted group is, the UE prepares the HARQ code starting from a DAI of 0. Specifically, the UE prepares the HARQ codebook according to a DAI order, and needs to supplement placeholder information for a middle group(s) that is(are) not triggered to send HARQ information. The placeholder mode can ensure that, for codebook positions corresponding to PDSCHs correctly received by the UE, the base station and the UE have consistent understanding.

Optionally, the placeholder information is preset information.

Optionally, the placeholder information is NACK information.

Optionally, the placeholder information is not information with a specific meaning such as NACK information, etc., or a position corresponding to the placeholder information cannot normally place the codebook. For example, it may be understood that the position corresponding to the placeholder information is left a blank, that is, is not used for placing codebook information.

An HARQ codebook corresponding to PDSCHs in group 0 and group 2 included in an HARQ codebook transmitted on PUCCH 2 may be shown as table 8.

TABLE 8

| DAI = 00 (PDSCH 0) | | DAI = 01 (PDSCH 1) | | DAI= 10 | |
|---|---|---|---|---|---|
| Codeword 0 | Codeword 1 | Codeword 0 | Codeword 1 | NACK | NACK |
| DAI = 11 | | DAI = 00 | | DAI = 01 (PDSCH 5) | |
| NACK | NACK | NACK | NACK | Codeword 0 | Codeword 1 |
| DAI = 10 (PDSCH 6) | | DAI = 11 (PDSCH 7) | | DAI = 00 (PDSCH 8) | |
| Codeword 0 | Codeword 1 | Codeword 0 | Codeword 1 | Codeword 0 | Codeword 1 |

An HARQ codebook corresponding to PDSCHs in group 1 and group 3 included in an HARQ codebook transmitted on PUCCH 3 may be shown as table 9.

TABLE 9

| DAI = 00 | | DAI = 01 | | DAI = 10 (PDSCH 2) | |
|---|---|---|---|---|---|
| NACK | NACK | NACK | NACK | Codeword 0 | Codeword 1 |
| DAI = 11 (PDSCH 3) | | DAI = 00 (PDSCH 4) | | DAI = 01 (PDSCH 5) | |
| Codeword 0 | Codeword 1 | Codeword 0 | Codeword 1 | NACK | NACK |
| DAI = 10 (PDSCH 6) | | DAI = 11 (PDSCH 7) | | DAI = 00 (PDSCH 8) | |

TABLE 9-continued

| NACK | NACK | NACK | NACK | NACK | NACK |
|---|---|---|---|---|---|
| DAI = 01 (PDSCH 9) | | DAI = 10 (PDSCH 10) | | | |
| Codeword 0 | Codeword 1 | Codeword 0 | Codeword 1 | | |

The present disclosure also provides a method for triggering a terminal device to perform feedback.

Optionally, it may be indicated through DCI indication information whether a channel group in the above multiple channel groups is triggered for feeding back.

In the implementation of the present disclosure, the terminal device can be simply and effectively triggered to feed back a codebook.

Herein, a quantity of groups may be configured by the base station or predefined. For example, a quantity of groups configured by the base station is 4.

Optionally, the first DCI may include one piece of valid HARQ timing indicator information, which is used for determining the above first uplink resource.

Optionally, the terminal device receives first Downlink Control Information (DCI), wherein the first DCI is used for scheduling a first PDSCH, the first PDSCH belongs to a first channel group, the first DCI includes first indication information, and the first indication information is used for indicating whether feeding back is triggered for a channel group in the multiple channel groups. Optionally, feedback triggering information of the multiple channel groups included in the first indication information is arranged in an order of group numbers from small to large or group numbers from large to small. That is, if an HARQ codebook of at least two groups is fed back on one uplink resource, the base station may trigger feedback in an order of group numbers from small to large (or group numbers from large to small or in an order designated by the base station) when triggering the UE to feed back HARQ information of this group.

In an implementation, the first indication information is used for indicating whether feeding back is triggered for a channel group except the first channel group in the multiple channel groups. For example, HARQ timing indicator information in the first DCI is used for determining the first uplink resource, and the first indication information is used for indicating whether feeding back is triggered for a channel group except the first channel group in the multiple channel groups on the first uplink resource.

For example, assuming that a first PDSCH belongs to channel group #0, and the base station is configured with 4 groups including the channel group #0, then the following contents may be included.

Optionally, HARQ information corresponding to the channel group #0 is fed back through a first uplink resource indicated by valid HARQ timing indicator information.

Optionally, HARQ information corresponding to another triggered channel group except the channel group #0 is also fed back through the first uplink resource.

Optionally, the first indication information includes group triggering information of 3 bits, wherein the group triggering information of 3 bits is used for indicating whether other channel groups except the channel group #0 are triggered to feed back HARQ information, respectively. Optionally, the group triggering information of 3 bits may be sorted from small to large according to numbers of other groups except a group to which the first PDSCH belongs (i.e., the channel group #0). For example, 100 indicates that group 1 is triggered, 010 indicates that group 2 is triggered, and 001 indicates that group 3 is triggered. For another example, 101 indicates that group 1 and group 3 are triggered.

Optionally, an HARQ codebook arrangement order corresponding to channel groups triggered for feeding back may be prepared according to a scheduling order. For example, the channel groups triggered for feeding back include groups #0, #1, and #2, and an order of groups scheduled by the base station (i.e., a DAI order) is group #1, group #0, and group #2, then the UE prepares an HARQ codebook according to an order of group #1, group #0, and group #2.

In another implementation, the first indication information is used for indicating whether each of the multiple channel groups is triggered for feeding back. For example, HARQ timing indicator information in the first DCI is used for determining the first uplink resource, and the first indication information is used for indicating whether each of the multiple channel groups is triggered for feeding back on the first uplink resource.

For example, assuming that a first PDSCH belongs to channel group #0, and the base station is configured with 4 groups including the channel group #0, then part or all of the following contents may be included.

Optionally, the first DCI includes one piece of valid HARQ timing indicator information, and the first DCI also includes group triggering information of 4 bits, wherein the 4 bits are used for indicating whether the 4 groups are triggered for HARQ information feedback.

Optionally, a value of the HARQ timing indicator information is meaningful only when the channel group #0 is triggered.

Optionally, the HARQ timing indicator information is used for indicating a first uplink resource used for HARQ information feedback corresponding to the triggered channel group.

Optionally, the channel group #0 may or may not be triggered for feeding back.

Optionally, the HARQ timing indicator information in the first DCI is specifically used for indicating that HARQ information corresponding to the first PDSCH will not be fed back temporarily, the first indication information is invalid. For example, the terminal device ignores the first indication information. Optionally, when the HARQ timing indicator information in the first DCI is specifically used for indicating that the HARQ information corresponding to the first PDSCH will not be fed back temporarily, the first indication information may be used for another purpose, for example, used as other information.

Optionally, the terminal device receives second DCI, wherein the second DCI is used for scheduling a second PDSCH, HARQ timing indicator information in the second DCI is used for indicating that HARQ information corresponding to the second PDSCH will not be fed back temporarily, and the second DCI does not include indication information for indicating whether a channel group in the multiple channel groups is triggered for feeding back.

For example, assuming that a second PDSCH belongs to channel group #0, and the base station is configured with 4 groups including the channel group #0, then part or all of the following contents may be included.

Optionally, the second DCI may not include indication information (i.e., the aforementioned 3 bits or 4 bits) that triggers HARQ information feedback of the at least one group, or indication information that triggers HARQ information feedback of the at least one group, included in the second DCI, indicates that feedback is not triggered. Or, a value of indication information that triggers HARQ information feedback of the at least one group, included in the second DCI, is meaningless. Or, a value of indication information that triggers HARQ information feedback of the at least one group, included in the second DCI, may be used for another purpose, for example, used as other information.

Optionally, the terminal device receives third DCI, wherein the third DCI is not used for scheduling a PDSCH, the third DCI includes second indication information, and the second indication information is used for indicating whether a channel group in the multiple channel groups is triggered for feeding back. Optionally, feedback triggering information of the multiple channel groups included in the second indication information is arranged in an order of group numbers from small to large or group numbers from large to small. Optionally, the third DCI further includes HARQ timing indicator information for determining the first uplink resource, and the second indication information is used for indicating whether feedback of each of the multiple channel groups is on the first uplink resource.

For example, assuming that the base station is configured with 4 groups, and the third DCI is not used for scheduling a PDSCH (for example, the third DCI is not used for scheduling PDSCHs within the 4 groups), then part or all of the following contents may be included. The third DCI may include 4 bits, wherein the 4 bits are used for indicating whether the 4 groups are triggered for feeding back HARQ information.

Optionally, the third DCI includes one piece of valid HARQ timing indicator information, wherein the valid HARQ timing indicator information is used for indicating an uplink resource used by HARQ information feedback corresponding to the triggered channel group. That is, the second indication information is used for indicating whether feedback of each of the multiple channel groups is on the first uplink resource.

When preparing the HARQ codebook, the UE may prepare if according to a DAI order or a scheduling order of the base station or an order of scheduled groups. Therefore, it can be ensured that, for codebook positions corresponding to PDSCHs correctly received by the UE, the base station and the UE have consistent understanding.

Figure 10:
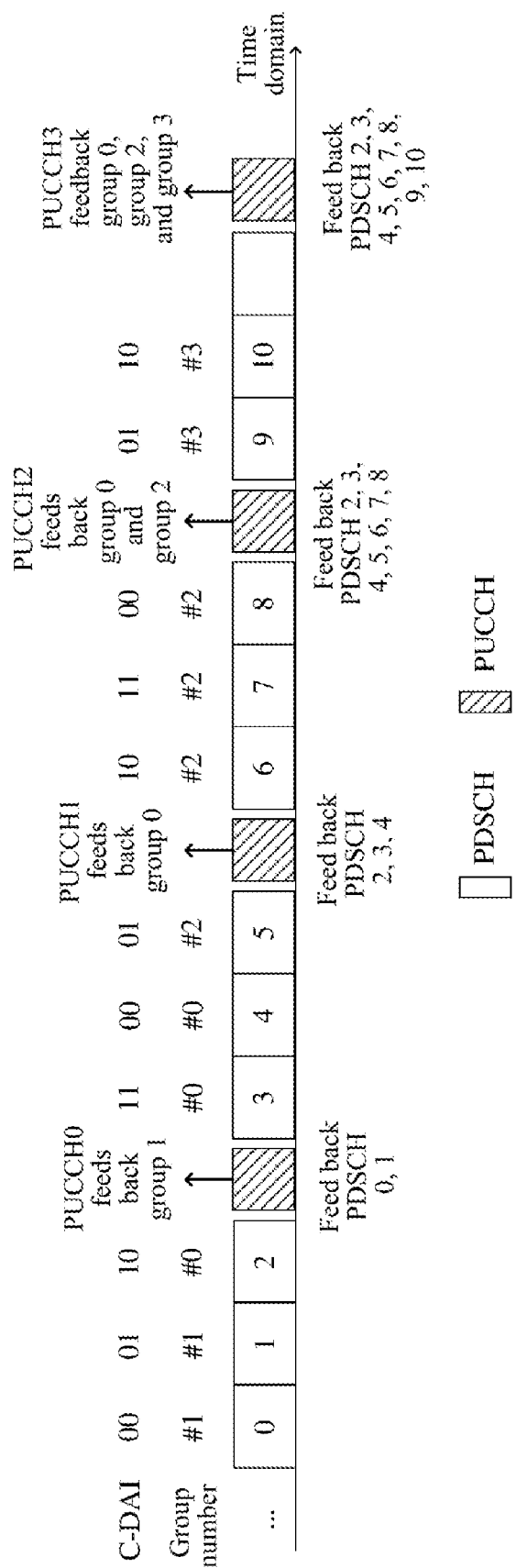
FIG. 10 is another schematic block diagram of a positional relationship among DAIs, PDSCH groups, and feedback groups according to an implementation of the present disclosure.

FIG. 10 is another schematic block diagram of a positional relationship among channel groups, DAIs, and feedback groups according to an implementation of the present disclosure.

With reference to FIG. 10, assuming that the base station is configured with four groups, when HARQ feedback is triggered, if a triggering signaling does not schedule a PDSCH, then a signaling for triggering to feed back HARQ of groups on PUCCH2 is 1010 (i.e. triggering to feed back group 0 and group 2 on PUCCH2), and a signaling of for triggering to feed back HARQ of groups on PUCCH3 is 1011 (i.e. triggering to feed back group 0, group 2, and group 3 on PUCCH2).

If a signaling for triggering to feed back HARQ on PUCCH2 is indicated by DCI scheduling PDSCH 8, then a triggering signaling is 100 (that is, group 2 to which PDSCH 8 belongs is triggered by default); if a signaling for triggering to feed back HARQ on PUCCH3 is indicated by a DCI scheduling PDSCH 10, then a triggering signaling is 101 (that is, group 3 to which PDSCH 10 belongs is triggered by default).

Herein, a UE prepares an HARQ codebook on PUCCH 2 according to an order of group #0 and group #2; and the UE prepares an HARQ codebook on PUCCH 3 according to an order of groups #0, #2, and #3.

The preferred implementations of the present disclosure have been described in detail above with reference to the accompanying drawings. However, the present disclosure is not limited to specific details of the implementations described above, and various simple variations may be made to the technical solutions of the present disclosure within the technical conception scope of the present disclosure, and these simple variations are all within the protection scope of the present disclosure.

For example, various specific technical features described in the specific implementations described above may be combined in any suitable mode without conflict. In order to avoid unnecessary repetition, various possible combination modes will not be further explained in the present disclosure.

For another example, various different implementations of the present disclosure may be combined arbitrarily as long as they do not violate the idea of the present disclosure, and the combinations should be regarded as the contents disclosed in the present disclosure as well.

It should be understood that sequence numbers of the foregoing processes do not mean execution sequences in various method implementations of the present disclosure. The execution sequences of the processes should be determined according to functions and internal logics of the processes, and should not be construed as any limitation on the implementation processes of the implementations of the present disclosure.

Method implementations of the present disclosure are described in detail above in combination with FIGS. 1 to 10. Device implementations of the present disclosure are described in detail below in combination with FIGS. 11 to 14.

Figure 11:
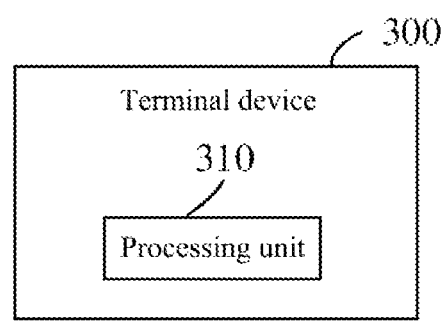
FIG. 11 is a schematic block diagram of a terminal device according to an implementation of the present disclosure.

FIG. 11 is a schematic block diagram of a terminal device 300 according to an implementation of the present disclosure.

Please referring to FIG. 11, the terminal device 300 may include: a processing unit 310, configured to: determine a first uplink resource, wherein the first uplink resource is used for feeding back a first HARQ codebook corresponding to at least one of multiple channel groups, wherein Downlink assignment indexes (DAIs) corresponding to Physical Downlink Shared Channels (PDSCHs) in the multiple channel groups are counted consecutively; and determine the first HARQ codebook for the first uplink resource.

Optionally, when a first DAI corresponding to a first PDSCH in a first channel group of the at least one channel group is not an initial value, information of the first HARQ codebook at a starting position is placeholder information.

Optionally, the first HARQ codebook between the starting position and a position corresponding to the first DAI is placeholder information, wherein the position corresponding to the first DAI is a position, determined based on a count of the first DAI, in the first HARQ codebook.

Optionally, the at least one channel group includes at least two channel groups.

Optionally, the at least two channel groups are channel groups with consecutively counted DAIs triggered for feeding back.

Optionally, the at least two channel groups include channel groups with disconsecutively counted DAIs triggered for feeding back, wherein the first HARQ codebook is an HARQ codebook generated based on a consecutively counted DAI, and a position corresponding to a channel group not triggered for feeding back in the first HARQ codebook is placeholder information.

Optionally, an arrangement order of channel groups in the multiple channel groups is a DAI counting order; or an arrangement order of channel groups in the multiple channel groups is a scheduling order.

Optionally, an arrangement order of channel groups in the at least one channel group is an order of channel groups triggered for feeding back in the multiple channel groups; or, an arrangement order of channel groups in the at least one channel group is a DAI counting order; or, an arrangement order of channel groups in the at least one channel group is a scheduling order.

Optionally, the terminal device 300 may further include: a communication unit, configured to receive first Downlink Control Information (DCI), wherein the first DCI is used for scheduling a first PDSCH, the first PDSCH belongs to a first channel group, the first DCI includes first indication information, and the first indication information is used for indicating whether a channel group in the multiple channel groups is triggered for feeding back.

Optionally, the first indication information is used for indicating whether a channel group except the first channel group in the multiple channel groups is triggered for feeding back; or, the first indication information is used for indicating whether each of the multiple channel groups is triggered for feeding back.

Optionally, feedback triggering information of the multiple channel groups included in the first indication information is arranged in an order of group numbers from small to large or group numbers from large to small.

Optionally, HARQ timing indicator information in the first DCI is used for determining the first uplink resource, and the first indication information is used for indicating whether a channel group except the first channel group in the multiple channel groups is triggered for feeding back on the first uplink resource; or, the first indication information is used for indicating whether each of the multiple channel groups is triggered for feeding back on the first uplink resource.

Optionally, the HARQ timing indicator information in the first DCI is specifically used for indicating that HARQ information corresponding to the first PDSCH will not be fed back temporarily, and the first indication information is invalid.

Optionally, the terminal device 300 may further include: a communication unit, configured to receive second DCI, wherein the second DCI is used for scheduling a second PDSCH, HARQ timing indicator information in the second DCI is used for indicating that HARQ information corresponding to the second PDSCH will not be fed back temporarily, and the second DCI does not include indication information for indicating whether a channel group in the multiple channel groups is triggered for feeding back.

Optionally, the terminal device 300 may further include: a communication unit, configured to receive third DCI, wherein the third DCI is not used for scheduling a PDSCH, the third DCI includes second indication information, and the second indication information is used for indicating whether a channel group in the multiple channel groups is triggered for feeding back.

Optionally, feedback triggering information of the multiple channel groups included in the second indication information is arranged in an order of group numbers from small to large or group numbers from large to small.

Optionally, the third DCI further includes HARQ timing indicator information for determining the first uplink resource, and the second indication information is used for indicating whether each of the multiple channel groups is fed back on the first uplink resource.

Optionally, the first uplink resource includes a Physical Uplink Control Channel (PUCCH) resource and/or a Physical Uplink Shared channel (PUSCH) resource.

It should be understood that the device implementations may correspond to the method implementations with each other, and description of the method implementations may be referred to for similar description of the device implementations. Specifically, the terminal device 300 shown in FIG. 11 may correspond to a corresponding subject performing the method 200 in the implementation of the present disclosure, and the above and other operations and/or functions of various units in the terminal device 300 are respectively for realizing corresponding flows of various methods in FIG. 1, which will not be repeated here for the sake of brevity.

Figure 12:
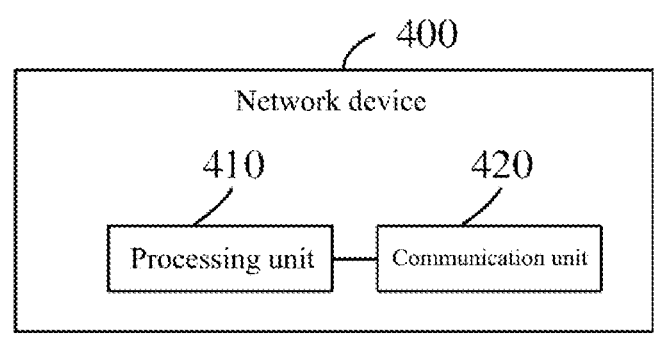
FIG. 12 is a schematic block diagram of a network device according to an implementation of the present disclosure.

FIG. 12 is a schematic block diagram of a network device 400 according to an implementation of the present disclosure.

Please referring to FIG. 12, the network device 400 may include: a processing unit 410, configured to determine a first uplink resource, wherein the first uplink resource is used for feeding back a first HARQ codebook corresponding to at least one of multiple channel groups, wherein Downlink assignment indexes (DAIs) corresponding to Physical Downlink Shared Channels (PDSCHs) in the multiple channel groups are counted consecutively; and a communication unit 420, configured to receive the first HARQ codebook on the first uplink resource.

Optionally, when a first DAI corresponding to a first PDSCH in a first channel group of the at least one channel group is not an initial value, information of the first HARQ codebook at a starting position is placeholder information.

Optionally, the first HARQ codebook between the starting position and a position corresponding to the first DAI is placeholder information, wherein the position corresponding to the first DAI is a position, determined based on a count of the first DAI, in the first HARQ codebook.

Optionally, the at least one channel group includes at least two channel groups.

Optionally, the at least two channel groups are channel groups with consecutively counted DAIs triggered for feeding back.

Optionally, the at least two channel groups include channel groups with disconsecutively counted DAIs triggered for feeding back, wherein the first HARQ codebook is an HARQ codebook generated based on a consecutively counted DAI, and a position corresponding to a channel group not triggered for feeding back in the first HARQ codebook is placeholder information.

Optionally, an arrangement order of channel groups in the multiple channel groups is a DAI counting order; or an arrangement order of channel groups in the multiple channel groups is a scheduling order.

Optionally, an arrangement order of channel groups in the at least one channel group is an order of channel groups triggered for feeding back in the multiple channel groups; or an arrangement order of channel groups in the at least one channel group is a DAI counting order; or, an arrangement order of channel groups in the at least one channel group is a scheduling order.

Optionally, the communication unit 420 is further configured to send first Downlink Control Information (DCI), wherein the first DCI is used for scheduling a first PDSCH, the first PDSCH belongs to a first channel group, the first DCI includes first indication information, and the first indication information is used for indicating whether a channel group in the multiple channel groups is triggered for feeding back.

Optionally, the first indication information is used for indicating whether a channel group except the first channel group in the multiple channel groups is triggered for feeding back; or, the first indication information is used for indicating whether each of the multiple channel groups is triggered for feeding back.

Optionally, feedback triggering information of the multiple channel groups included in the first indication information is arranged in an order of group numbers from small to large or group numbers from large to small.

Optionally, HARQ timing indicator information in the first DCI is used for determining the first uplink resource, and the first indication information is used for indicating whether a channel group except the first channel group in the multiple channel groups is triggered for feeding back on the first uplink resource; or, the first indication information is used for indicating whether each of the multiple channel groups is triggered for feeding back on the first uplink resource.

Optionally, the HARQ timing indicator information in the first DCI is specifically used for indicating that HARQ information corresponding to the first PDSCH will not be fed back temporarily, and the first indication information is invalid.

Optionally, the communication unit 420 is further configured to send second DCI, wherein the second DCI is used for scheduling a second PDSCH, HARQ timing indicator information in the second DCI is used for indicating that HARQ information corresponding to the second PDSCH will not be fed back temporarily, and the second DCI does not include indication information for indicating whether a channel group in the multiple channel groups is triggered for feeding back.

Optionally, the communication unit 420 is further configured to send third DCI, wherein the third DCI is not used for scheduling a PDSCH, the third DCI includes second indication information, and the second indication information is used for indicating whether a channel group in the multiple channel groups is triggered for feeding back.

Optionally, feedback triggering information of the multiple channel groups included in the second indication information is arranged in an order of group numbers from small to large or group numbers from large to small.

Optionally, the third DCI further includes HARQ timing indicator information for determining the first uplink resource, and the second indication information is used for indicating whether each of the multiple channel groups is fed back on the first uplink resource. Optionally, the first uplink resource includes a Physical Uplink Control Channel (PUCCH) resource and/or a Physical Uplink Shared channel (PUSCH) resource.

It should be understood that the device implementations may correspond to the method implementations with each other, and description of the method implementations may be referred to for similar description of the device implementations. It should be understood that the network device 400 shown in FIG. 12 may correspond to a corresponding subject performing the method 200 in the implementation of the present disclosure, and the above and other operations and/or functions of various units in the network device 400 are respectively for realizing corresponding flows of various methods in FIG. 1, which will not be repeated here for the sake of brevity.

In the above, the communication device according to an implementation of the present disclosure is described from a perspective of a functional module. It should be understood that the functional module may be realized in form of hardware, or through instructions in form of software, or through a combination of hardware and software modules.

Specifically, various acts of the method implementations in the implementations of the present disclosure can be implemented by hardware integrated logic circuits and/or instructions in the form of software in a processor, and the acts of methods disclosed with reference to the implementations of the present disclosure may be directly executed and implemented by a hardware decoding processor, or may be implemented by a combination of hardware and software modules in the decoding processor.

Optionally, the software modules may be located in a storage medium commonly used in the art, such as a random access memory, a flash memory, a read-only memory, a programmable read-only memory, an electrically erasable programmable memory, or a register, etc. The storage medium is located in the memory, and the processor reads information in the memory and completes the acts of the above method implementations in combination with its hardware.

For example, in an implementation of the present disclosure, the processing unit 310 shown in FIG. 11 and the processing unit 410 shown in FIG. 12 may be implemented by a processor, and the communication unit 420 shown in FIG. 12 may be implemented by a transceiver.

Figure 13:
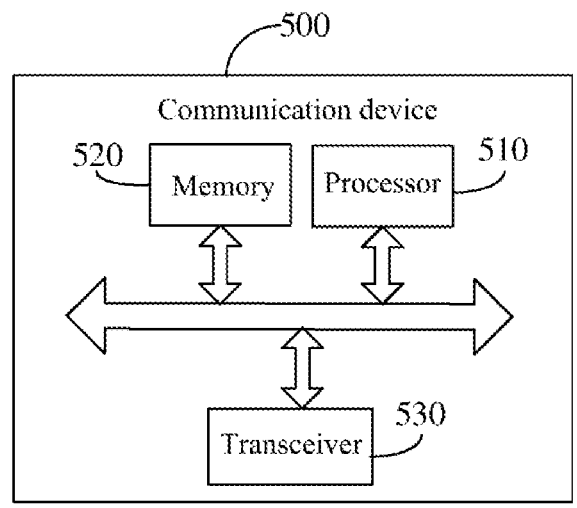
FIG. 13 is a schematic block diagram of a communication device according to an implementation of the present disclosure.

FIG. 13 is a schematic diagram of a structure of a communication device 500 according to an implementation of the present disclosure.

Please referring to FIG. 13, the communication device 500 may include a processor 510, wherein the processor 510 may call and run a computer program from a memory to implement the methods in the implementations of the present disclosure.

Optionally, the communications device 500 may further include a memory 520.

The memory 520 may be configured to store indication information, or may be configured to store codes, instructions, etc., executed by the processor 510. The processor 510 may call and run the computer program from the memory 520 to implement the methods in the implementations of the present disclosure.

The memory 520 may be a separate device independent of the processor 510 or may be integrated in the processor 510.

Optionally, the communication device 500 may further include a transceiver 530, and the processor 510 may control the transceiver 530 to communicate with another device. Specifically, information or data may be sent to another device, or information or data sent by another device may be received.

The transceiver 530 may include a transmitter and a receiver. The transceiver 530 may further include antennas, and the quantity of which may be one or more.

Optionally, the communication device 500 may be a terminal device according to the implementations of the present disclosure, and the communication device 500 may implement corresponding processes implemented by the terminal device in various methods in the implementations of the present disclosure, that is to say, the communication device 500 according to the implementations of the present disclosure may correspond to the terminal device 300 in the implementations of the present disclosure, and may correspond to a corresponding subject that executes the method 200 according to the implementations of the present disclosure, which will not be described here for brevity.

Optionally, the communication device 500 may be a network device according to an implementation of the present disclosure, and the communication device 500 may implement corresponding processes implemented by the network device in various methods of implementations of the present disclosure. That is to say, the communication device 500 in the implementations of the present disclosure may correspond to the network device 400 in the implementations of the present disclosure, and may correspond to a corresponding subject that executes the method 200 according to the implementations of the present disclosure, which will not be described here for brevity.

It should be understood that the various components in the communication device 500 are connected through a bus system. In addition to a data bus, the bus system further includes a power bus, a control bus, a status signal bus, etc.

In addition, an implementation of the present disclosure further provides a chip, which may be an integrated circuit chip with a signal processing capability, and can implement or execute the methods, acts and logic block diagrams disclosed in the implementations of the present disclosure.

Optionally, the chip may be applied to various communication devices, so that the communication devices with the chip installed therein can perform the methods, acts and logic block diagrams disclosed in the implementations of the present disclosure.

Figure 14:
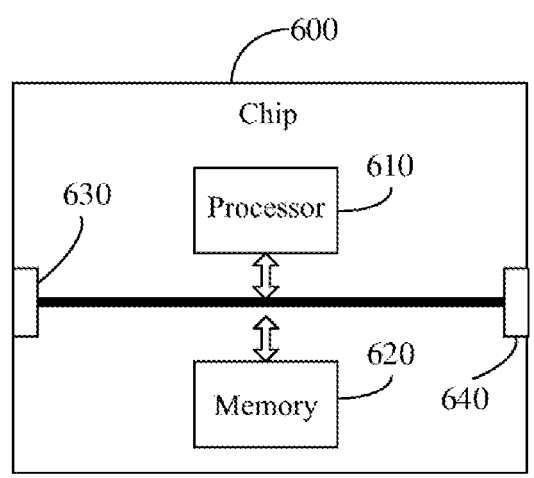
FIG. 14 is a schematic block diagram of a chip according to an implementation of the present disclosure.

FIG. 14 is a schematic diagram of a structure of a chip according to an implementation of the present disclosure.

A chip 600 shown in FIG. 14 includes a processor 610.

The processor 610 may call and run a computer program from a memory to implement the method in the implementation of the present disclosure.

Optionally, the chip 600 may further include a memory 620.

The processor 610 may call and run the computer program from the memory 620 to implement the methods in the implementations of the present disclosure. The memory 620 may be configured to store indication information, or may be configured to store codes, instructions, etc., executed by the processor 610. The memory 620 may be a separate device independent of the processor 610 or may be integrated in the processor 610.

Optionally, the chip 600 may further include an input interface 630.

The processor 610 may control the input interface 630 to communicate with other devices or chips. Specifically, the processor 610 may acquire information or data sent by other devices or chips.

Optionally, the chip 600 may further include an output interface 640.

The processor 610 may control the output interface 640 to communicate with other devices or chips. Specifically, the processor 610 may output information or data to other devices or chips.

Optionally, the chip may be applied to the network device in the implementations of the present disclosure, and the chip may implement the corresponding processes implemented by the network device in various methods in accordance with the implementations of the present disclosure, which will not be repeated herein for brevity. Optionally, the chip may be applied to the terminal device in the implementations of the present disclosure, and the chip may implement the corresponding processes implemented by the terminal device in various methods in accordance with the implementations of the present disclosure, which will not be repeated herein for brevity.

It should be understood that the chip mentioned in the implementations of the present disclosure may be referred to as a system-level chip, a system chip, a chip system or a system-on-chip, etc. It should also be understood that, various components in the chip 600 are connected through a bus system, herein, in addition to a data bus, the bus system further includes a power bus, a control bus and a state signal bus.

The processor may include, but is not limited to, a general purpose processor, a Digital Signal Processing (DSP), an Application Specific Integrated Circuit (ASIC), a Field Programmable Gate Array (FPGA) or another programmable logic device, a discrete gate or a transistor logic device, or a discrete hardware component, etc.

The processor may be configured to implement or perform methods, acts and logical block diagrams disclosed in the implementations of the present disclosure. The acts of the methods disclosed in the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an erasable programmable memory, a register, etc. The storage medium is located in the memory, and the processor reads information in the memory and completes the acts of the foregoing methods in combination with its hardware.

The memory includes but is not limited to, a volatile memory and/or nonvolatile memory. The non-volatile memory may be a Read-Only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through an exemplary but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DR-RAM).

It should be noted that the memory in the systems and methods described herein is intended to include, but is not limited to, these and any other suitable types of memories.

An implementation of the present disclosure further provides a computer readable storage medium, configured to store a computer program. The computer readable storage medium stores one or more programs including instructions that, when executed by a portable electronic device including multiple application programs, enable the portable electronic device to perform the method of an implementation shown for the method 200.

Optionally, the computer readable storage medium may be applied to a network device in an implementation of the present disclosure, and the computer program enables a computer to perform the corresponding processes implemented by the network device in various methods of the implementations of the present disclosure, which will not be repeated here for brevity.

Optionally, the computer readable storage medium may be applied to a mobile terminal/terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product, including a computer program.

Optionally, the computer program product may be applied in the network device of the implementation of the present disclosure, and the computer program enables the computer to perform the corresponding processes implemented by the network device in various methods of implementations of the present disclosure, which is not repeated here again for the sake of brevity.

Optionally, the computer program product may be applied in the mobile terminal/terminal device of the implementation of the present disclosure, and the computer program enables the computer to perform the corresponding processes implemented by the mobile terminal/terminal device in various methods of implementations of the present disclosure, which is not repeated here again for the sake of brevity.

An implementation of the present disclosure further provides a computer program. When the computer program is executed by a computer, the computer is enabled to execute the method of an implementation shown for the method 200.

Optionally, the computer program may be applied to the network device in the implementations of the present disclosure, and the computer program, when running on a computer, enables the computer to perform the corresponding processes implemented by the network device in various methods of the implementations of the present disclosure, which will not be repeated herein for brevity.

An implementation of the present disclosure also provides a communication system, which may include the terminal device 300 as shown in FIG. 11 and the network device 400 as shown in FIG. 12. Herein, the terminal device 300 may be configured to implement the corresponding functions implemented by the terminal device in the above-mentioned method 200, and the network device 400 may be configured to implement the corresponding functions implemented by the network device in the above-mentioned method 200, and this will not be repeated here for brevity.

It should be understood that the terms used in implementations of the present disclosure and the appended claims are for the purpose of describing specific implementations only but are not intended to limit implementations of the present disclosure.

For example, the singular forms "a", "said", "the above" and "the" used in the implementations of the present disclosure and the appended claims are also intended to include the plural forms unless the context clearly indicates other meanings.

Those skilled in the art may recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such realization should not be considered to be beyond the scope of implementations of the present disclosure.

The function units may be stored in a computer readable storage medium if realized in a form of software functional units and sold or used as a separate product. Based on this understanding, the technical solution of implementations of the present disclosure, in essence, or the part contributing to the existing art, or a part of the technical solution, may be embodied in a form of a software product. The computer software product is stored in a storage medium, including a number of instructions for enabling a computer device (which may be a personal computer, a server, or a network device, or the like) to perform all or part of the acts of the methods described in various implementations of the present disclosure. And the aforementioned storage medium includes various kinds of media that may store program codes, such as a USB flash disk, a removable hard disk, a Read-Only Memory (ROM), a Random Access Memory (RAM), a magnetic disk or an optical disk, etc.

Those skilled in the art may clearly understand that for the sake of convenience and conciseness of description, the specific working processes of the systems, devices and units described above may refer to the corresponding processes in the above method implementations, and will not be repeated herein.

In several implementations provided by the present disclosure, it should be understood that the disclosed systems, devices and methods may be implemented in another mode.

For example, the division of the units, modules or components in the above-mentioned device implementations is only a logical function division, and there may be another division mode in an actual realization. For example, multiple units, modules or components may be combined or integrated into another system, or some units or components may be ignored or not executed.

For another example, the units/modules/components described above as separate/display components may or may not be physically separated, i.e., they may be located in one place or may be distributed over multiple network units. Part or all of the units/modules/components therein may be selected according to an actual requirement to achieve a purpose of the implementations of the present disclosure.

Finally, it should be noted that the mutual coupling or direct coupling or communication connection shown or discussed in the above may be indirect coupling or communication connection through some interfaces, apparatuses or units, and may be in electrical, mechanical or other forms.

What are described above are merely specific implementations of the present disclosure, but the protection scope of implementations of the present disclosure is not limited thereto. Any variation or substitution that may be easily conceived by a person skilled in the art within the technical scope disclosed by the present disclosure shall be included within the protection scope of the present disclosure. Therefore, the protection scope of the implementations of the present disclosure shall be determined by the protection scope of the claims.

What is claimed is:

1. A method for determining a Hybrid Automatic Repeat reQuest (HARQ) codebook, comprising:
   receiving, by a terminal device, first Downlink Control Information (DCI), wherein the first DCI is used for scheduling a first Physical Downlink Shared Channel (PDSCH), the first PDSCH belongs to a first channel group in a plurality of channel groups, and the first DCI comprises first indication information and valid HARQ timing indicator information, and wherein the first indication information is used for indicating whether feeding back is triggered for a channel group except the first channel group in the plurality of channel groups, and the channel groups are PDSCH channel groups;
   determining, by the terminal device, first uplink resource based on the valid HARQ timing indicator information;
   determining, by the terminal device, a first HARQ codebook corresponding to the plurality of channel groups for the first uplink resource; wherein a quantity of the plurality of channel groups is predefined, and a HARQ codebook size of the first HARQ codebook is fixed in accordance with the predefined quantity of the plurality of channel groups; and
   sending, by the terminal device, the first HARQ codebook to a network device;
   wherein Downlink assignment indexes (DAIs) that correspond to the PDSCHs in the plurality of channel groups with different group indicators (GIs) are counted consecutively;
   wherein when a first DAI corresponding to the first PDSCH in the first channel group is not an initial value, information of a starting position of the first HARQ codebook is placeholder information; and wherein the placeholder information is NACK information.

2. The method of claim 1, wherein the method further comprises:
   receiving, by the terminal device, a second DCI, wherein the second DCI is used for scheduling a second PDSCH, HARQ timing indicator information in the second DCI is used for indicating that HARQ information corresponding to the second PDSCH will not be fed back temporarily, and the second DCI does not comprise indication information for indicating whether feeding back is triggered for a channel group in the plurality of channel groups.

3. The method of claim 1, wherein the method further comprises:
   receiving, by the terminal device, a third DCI, wherein the third DCI is not used for scheduling a PDSCH, the third DCI comprises second indication information, and the second indication information is used for indicating whether feeding back is triggered for a channel group in the plurality of channel groups.

4. A method for receiving a Hybrid Automatic Repeat request (HARQ) codebook, comprising:
   determining, by a network device, a first uplink resource, wherein the first uplink resource is used for feeding back a first HARQ codebook corresponding to at least one of the plurality of channel groups;
   sending, by the network device to a terminal device, first Downlink Control Information (DCI), wherein the first DCI is used for scheduling a first Physical Downlink Shared Channel (PDSCH), the first PDSCH belongs to a first channel group in the plurality of channel groups, and the first DCI comprises first indication information and valid HARQ timing indicator information, and wherein the first indication information is used for indicating whether feeding back is triggered for a channel group except the first channel group in the plurality of channel groups; wherein the channel groups are PDSCH channel groups; and wherein the valid HARQ timing indicator information is used for the terminal device to determine the first uplink resource; and
   receiving, by the network device, the first HARQ codebook on the first uplink resource;
   wherein a quantity of the plurality of PDSCH channel groups is predefined, and a HARQ codebook size of the first HARQ codebook is fixed in accordance with the predefined quantity of the plurality of channel groups;

wherein Downlink assignment indexes (DAIs) corresponding to PDSCHs in the plurality of channel groups with different group indicators (GIs) are counted consecutively;

wherein when a first DAI corresponding to the first PDSCH in the first channel group is not an initial value, information of the first HARQ codebook at a starting position is placeholder information; and wherein the placeholder information is NACK information.

5. The method of claim 4, wherein the method further comprises:

receiving, by the terminal device, a second DCI, wherein the second DCI is used for scheduling a second PDSCH, HARQ timing indicator information in the second DCI is used for indicating that HARQ information corresponding to the second PDSCH will not be fed back temporarily, and the second DCI does not comprise indication information for indicating whether feeding back is triggered for a channel group in the plurality of channel groups.

6. A network device, comprising: a processor, a memory, and a transceiver, wherein the memory is configured to store a computer program, the transceiver is configured to communicate with another device under control of the processor, and the processor is configured to call and run the computer program stored in the memory to:

determine a first uplink resource, wherein the first uplink resource is used for feeding back a first HARQ codebook corresponding to at least one of the plurality of channel groups;

send, through the transceiver, to a terminal device first Downlink Control Information (DCI), wherein the first DCI is used for scheduling a first Physical Downlink Shared Channel (PDSCH), the first PDSCH belongs to a first channel group in the plurality of channel groups, and the first DCI comprises first indication information and valid HARQ timing indicator information, and wherein the first indication information is used for indicating whether feeding back is triggered for a channel group except the first channel group in the plurality of channel groups; wherein the channel groups are PDSCH channel groups; and wherein the valid HARQ timing indicator information is used for the terminal device to determine the first uplink resource; and receive, through the transceiver, the first HARQ codebook on the first uplink resource;

wherein a quantity of the plurality of PDSCH channel groups is predefined, and a HARQ codebook size of the first HARQ codebook is fixed in accordance with the predefined quantity of the plurality of channel groups;

wherein Downlink assignment indexes (DAIs) corresponding to PDSCHs in the plurality of channel groups with different group indicators (GIs) are counted consecutively;

wherein when a first DAI corresponding to the first PDSCH in the first channel group is not an initial value, information of the first HARQ codebook at a starting position is placeholder information; and wherein the placeholder information is NACK information.

7. The network device of claim 6, wherein the processor is configured to:

receive, through the transceiver, a second DCI, wherein the second CI is used for scheduling a second PDSCH, HARQ timing indicator information in the second DCI is used for indicating that HARQ information corresponding to the second PDSCH will not be fed back temporarily, and the second DCI does not comprise indication information for indicating whether feeding back is triggered for a channel group in the plurality of channel groups.

8. The network device of claim 6, wherein the processor is configured to:

receive, through the transceiver, a third DCI, wherein the third DCI is not used for scheduling a PDSCH, the third DCI comprises second indication information, and the second indication information is used for indicating whether feeding back is triggered for a channel group in the plurality of channel groups.

* * * * *